United States Patent [19]

Huber

[11] Patent Number: 5,243,609
[45] Date of Patent: Sep. 7, 1993

[54] LASER WITH LONGITUDINAL MODE SELECTION

[75] Inventor: David R. Huber, Warrington, Pa.

[73] Assignee: General Instrument Corporation, Hatboro, Pa.

[21] Appl. No.: 887,090

[22] Filed: May 22, 1992

Related U.S. Application Data

[63] Continuation-in-part of Ser. No. 770,762, Oct. 9, 1991, Pat. No. 5,151,908, which is a continuation-in-part of Ser. No. 616,024, Nov. 20, 1990, Pat. No. 5,134,620.

[51] Int. Cl.$^5$ ............................................. H01S 3/30
[52] U.S. Cl. .................................... 372/19; 372/6; 372/94; 372/102
[58] Field of Search ............... 372/6, 18, 19, 94, 98, 372/102

[56] References Cited

U.S. PATENT DOCUMENTS

| | | | |
|---|---|---|---|
| 4,435,808 | 3/1984 | Javan | 372/11 |
| 4,852,960 | 8/1989 | Alferness et al. | 350/96.19 |
| 5,077,746 | 12/1991 | Ewart | 372/19 |
| 5,166,940 | 11/1992 | Tumminelli et al. | 372/6 |
| 5,166,941 | 11/1992 | Hackel | 372/9 |

OTHER PUBLICATIONS

C. M. Ragdale, et al., "Narrowband Fiber Grating Filters," *IEEE Journal on Selected Areas in Communications*, vol. 7, No. 6, Aug. 1990, pp. 1146–1150.

*Primary Examiner*—Frank Gonzalez
*Attorney, Agent, or Firm*—Barry R. Lipsitz

[57] ABSTRACT

A laser is fabricated from an optical transmission medium having a laser cavity with an rare earth (e.g. Erbium) doped portion. At least one longitudinal mode is suppressed using a plurality of series coupled Fabry-Perot cavities, an optical grating, or a combination thereof. Ring lasers, Sagnac cavity lasers, Fox-Smith cavity lasers, and linear structures are disclosed.

15 Claims, 5 Drawing Sheets

LASER WITH LONGITUDINAL MODE SELECTION

This application is a continuation-in-part of commonly assigned, copending U.S. patent application Ser. No. 07/770,762, filed on Oct. 9, 1991, U.S. Pat. No. 5,151,908 issued on Sep. 29, 1992 which is a continuation-in-part of commonly assigned, copending U.S. patent application Ser. No. 07/616,024, filed on Nov. 20, 1990 U.S. Pat. No. 5,134,620 issued on Jul. 28, 1992.

BACKGROUND OF THE INVENTION

The present invention relates to lasers, and more particularly, to a rare earth element doped laser with longitudinal mode selection. The doped laser is implemented in an optical transmission medium such as an optical fiber or silica waveguide. The rare earth material can comprise, for example, Erbium, Neodymium or Praseodymium.

Applications for optical fiber technology are expanding at a rapid pace. Telecommunication, sensors, medical and video transmission can all take advantage of optical technology, particularly where virtually unlimited bandwidth and low attenuation are beneficial. Cable television systems are one example where optical fiber technology is providing efficient and economical alternatives to prior coaxial cable distribution schemes.

Many applications for fiber optic technology would be more cost effective if higher power lasers operating in the 1.3 or 1.5 micron ("$\mu$m") region were available. It has been demonstrated that a $Er^{3+}$ fiber laser can produce high levels of power. See, e.g., M. S. O'Sullivan, et al, "High Power Narrow Linewidth Erbium-Doped Fiber Laser", CLEO 1989, TUP3, pp. 134–136. A drawback of an erbium doped fiber laser as taught in the referenced article is that it has multiple longitudinal modes. Some applications, such as the transmission of complex video signals over an optical fiber in a cable television distribution network or the like, require the laser to operate at only a single longitudinal mode or, at most, only a few such modes separated sufficiently in optical frequency. Otherwise, beating will occur (e.g., between optical longitudinal modes that fall in the radio frequency domain) resulting in unacceptable levels of noise in the RF band of interest. Those modes of laser operation that are close enough together to be on the order of RF frequencies (i.e., 5.75 MHz to 550 MHz or higher for the cable television spectrum) must be suppressed in order to use such lasers for CATV applications. After suppression, the only remaining modes will not produce beat frequencies in the RF domain. Multiple longitudinal operation may also exhibit excess intensity noise (RIN) owing to the mode partition noise as the various modes turn on and off. As is well known in the art, the actual modes present in a given laser are determined by the geometry of the laser cavity, laser gain spectrum and frequency selective elements in the cavity.

It would be advantageous to provide a rare earth element doped laser in which all but one mode is suppressed. Those skilled in the art will appreciate that additional modes can remain as long as they are far enough apart in frequency so that beating does not occur. Such a laser should be operable without producing interfering beats in the RF spectrum. The resultant energy from the laser must comprise a clean optical carrier for signal transmission.

The present invention provides a laser having the aforementioned advantages.

SUMMARY OF THE INVENTION

In accordance with the present invention, a laser is provided for producing a clean optical carrier. The laser comprises an optical transmission medium, such as an optical fiber, having a laser cavity with a rare earth element doped portion. Means are associated with the cavity for suppressing at least one mode thereof. The suppressing means comprise an optical resonator such as a grating, Fabry-Perot cavity, or a combination of such elements within the transmission medium. The suppressing means can be provided in the doped portion of the cavity or outside the doped portion.

In one embodiment, the transmission medium has a ring configuration and the suppressing means comprise an optical grating resonator, such as a Moire grating, within a portion of the ring. An optical isolator is provided within the ring so that oscillation will occur in only one direction.

In an alternate embodiment, the transmission medium comprises a Sagnac resonator. A Fox-Smith resonator can alternatively be used to select a single mode of laser operation. In either case, the suppressing means can comprise a Moire grating or the like.

In another embodiment, the optical transmission medium has a ring or linear configuration and the suppressing means comprise a plurality of series-coupled Fabry-Perot cavities within the ring. The Fabry-Perot cavities are of unequal length to provide the desired mode suppression. An optical isolator is provided within the laser cavity. An optical grating can also be provided within the transmission medium containing the Fabry-Perot cavities to enhance mode selection.

In an embodiment using series coupled Fabry-Perot cavities, a first Fabry-Perot cavity of length L is formed from an optical material containing a laser medium to provide a laser cavity. A second Fabry-Perot cavity of length l, where l<L, is centered or approximately centered within the first Fabry-Perot cavity. The length L of the first Fabry-Perot cavity is selected to limit the longitudinal modes of the laser cavity. The length l of the second Fabry-Perot cavity is selected to minimize gain except at a desired lasing wavelength. A polarization filter can be provided near the second Fabry-Perot cavity to suppress lasing in two polarization modes.

The first Fabry-Perot cavity can comprise a reflector at one end thereof and a grating at the other end thereof. The second Fabry-Perot cavity can comprise a pair of closely spaced reflectors, such as metallic, dielectric or grating structures. The finesse of the second Fabry-Perot cavity must be high enough to select only one of the longitudinal modes supported by the laser cavity formed by the first Fabry-Perot. The optical material can comprise, for example, an optical fiber or a silica waveguide at least partially doped with a rare earth material, such as Erbium, Neodymium or Praseodymium.

In another embodiment, mode selection is accomplished using an external grating coupled to the doped laser cavity. An optical isolator is provided in series with the laser cavity. The laser cavity can be an optical fiber, silica wave guide, or other known structure. The rare earth doping element can comprise Erbium, Neodymium, Praseodymium, or a similar element.

In yet another embodiment, a Moire grating is provided within a Fabry-Perot cavity. The Fabry-Perot cavity has a length that is selected to limit the longitudinal modes of the laser cavity and the Moire grating has a transmission peak at a desired one of said modes.

DETAILED DESCRIPTION OF THE INVENTION

The present invention provides a rare earth laser with longitudinal mode selection. Various embodiments are illustrated, including linear, ring and Sagnac cavity lasers. Additional embodiments, including Fox-Smith cavity lasers, will be apparent to those skilled in the art from the following description. Indeed, any type of guided wave, optical fiber laser cavity can be used in accordance with the present invention.

Figure 1:
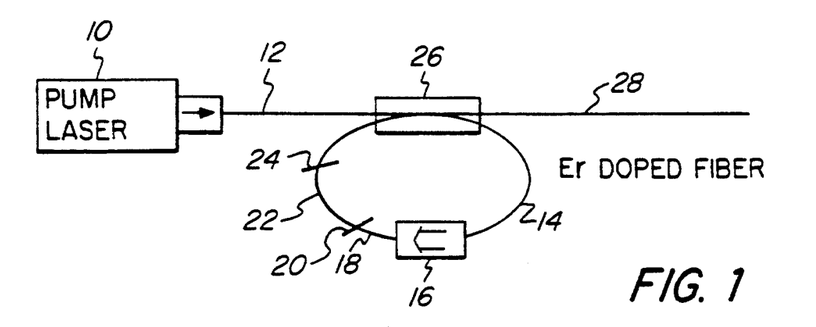
FIG. 1 is a schematic diagram of an Erbium fiber ring laser with Fabry-Perot longitudinal mode selection.

In the embodiment illustrated in FIG. 1, a ring cavity laser comprises an Erbium doped optical fiber 14. The Erbium doping (gain medium) establishes the optical gain. Erbium is particularly useful for lasers operating in the 1.5 micron region, whereas Neodymium and Praseodymium are particularly useful in the 1.3 micron region. Laser cavity 14 is pumped by a pump laser 10 that communicates via an optical fiber 12 to a conventional coupler 26 that couples the laser cavity to an output fiber 28. For the Erbium embodiment, pump laser 10 can operate at a standard 980 nm or 1480 nm wavelength. Optical isolator 16 is provided within the ring so that the ring will only support a traveling wave oscillation in one direction. The optical isolator is a commercially available type that only passes one polarization, such that undesired polarization modes are prevented from lasing. Using a single polarization allows a high finesse cavity to be realized. Bifringence is not a problem since only one polarization is excited. The output of optical isolator 16 is coupled via optical fiber 18 to a first mirror 20, that in turn is coupled via optical fiber 22 to a second mirror 24. The use of mirrors 20 and 24 results in a pair of unequal length Fabry-Perot interferometers in series to provide wavelength selectivity within the ring laser. A discussion of the operation of Fabry-Perot interferometers can be found in D. R. Huber and J. B. Carroll, "Time Domain Response Of An Optically Frequency Swept Fabry-Perot Interferometer", *Applied Optics*, 1986, Vol. 25, pp. 2386-2390.

In the structure illustrated in FIG. 1, the concatenation of Fabry-Perot interferometers within the ring is used to select fewer longitudinal modes within the laser cavity. The lengths of the cavities are selected to reduce the number of modes. In an implementation using an Erbium doped silica substrate, the dimension of the two cavities can be made such that only a single mode is supported. It is also possible to provide a single mode using one cavity, for example, as illustrated in FIG. 3 discussed below.

It is desirable to make the diameter of the ring as small as possible. This is due to the fact that the smaller the ring diameter, the further apart the longitudinal modes will be. Those skilled in the art will appreciate that the entire ring can be doped with Erbium, or just a portion 14 can be doped as shown in FIG. 1.

Figure 2:
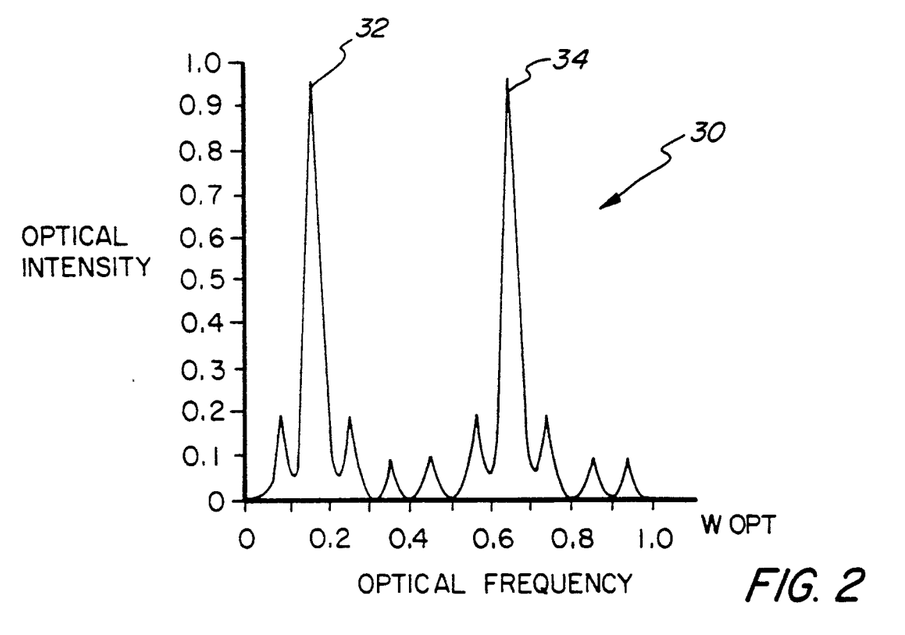
FIG. 2 is a graph illustrating the transfer function of two Fabry-Perot cavities in series, as in the laser of FIG. 1.

FIG. 2 illustrates the transfer function, generally designated 30, of the two-series Fabry-Perot cavities shown in FIG. 1. Coinciding frequencies of the coupled cavities add, and the transfer function is the product of the frequencies within each cavity. Thus, for example, by configuring the cavity formed by Erbium doped fiber 14, optical isolator 16 and optical fiber 18 to resonate at one set of frequencies and the cavity comprising optical fiber 22 to resonate at another set of frequencies, only the coinciding frequencies 32, 34 in each cavity will add and all others will be substantially cancelled out.

Figure 3:
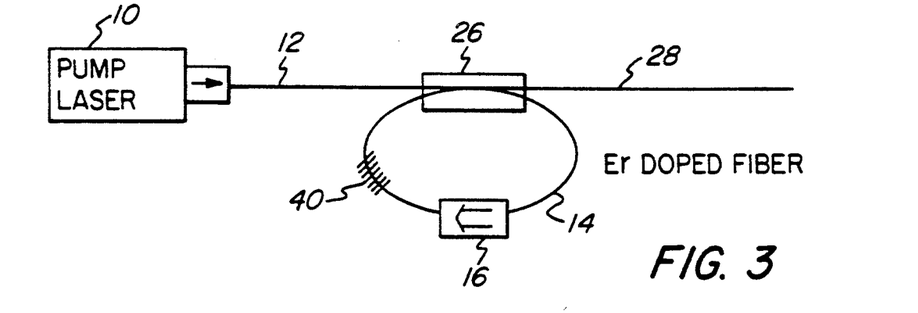
FIG. 3 is a schematic diagram of an Erbium fiber ring laser with a fiber grating for mode selection.

FIG. 3 illustrates an embodiment wherein a grating resonator structure 40 (e.g., a Moire type grating) is substituted for the Fabry-Perot interferometers of FIG. 1 to provide mode selection. The theory and fabrication of such gratings is discussed in Ragdale, Catherine M. et al, "Narrow Band Fiber Grating Filters," *IEEE Journal on Selected Areas in Communications*, Vol. 8, No. 6, August 1990, pp. 1146-1150. As noted therein, a grating resonator consists of two Bragg grating sections separated by a phase shift section. When the wavelength is such that the two grating sections are out of phase, there is a strong peak in the transmission response and a corresponding dip in the Bragg reflection response. See also, K. L. Belsley, J. B. Carroll, L. A. Hess, D. R. Huber, and D. Schmadel, "Optically Multiplexed Interferometric Fiber Optic Sensor System", SPIE, 1985, Vol. 566, pp. 257-264 and in W. V. Sorin and S. A. Newton, "Single-Frequency Output From A Broadband-Tunable External-Fiber-Cavity Laser", OFC 1988, Vol. WQ26, pp. 123.

In order to fabricate a laser in accordance with the present invention, the grating dimensions must be chosen to provide a single mode frequency peak having a desired wavelength within the gain curve of the Erbium laser. The transmission response of an experimentally realized grating of this type is illustrated in FIG. 11.

Figure 11:
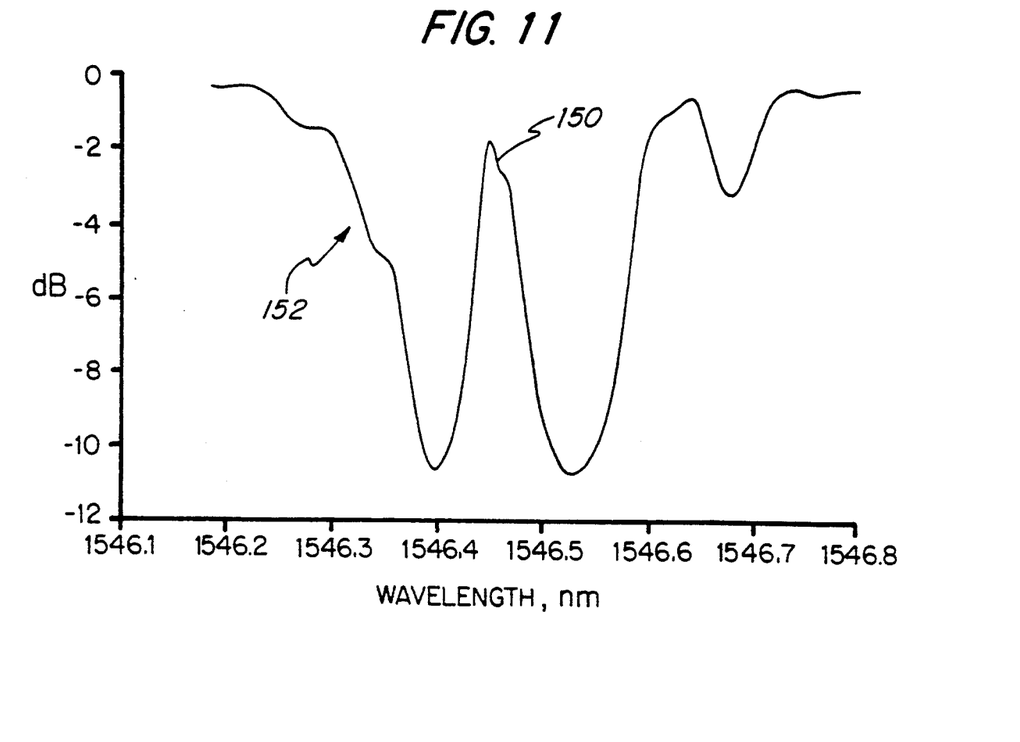
FIG. 11 is a graph showing the transmission response of an in fiber grating resonator used in accordance with the present invention.

As can be seen from the spectra generally designated 152 in FIG. 11, a very narrow peak 150 provides a 3 dB optical bandpass of about 4 GHz. The experimental grating is a Bragg grating that was induced in an optical fiber by the photorefractive effect. Its length is about 23 mm, and a 1 mm gap was provided at the center of the grating to enable resonance to occur. The use of such a grating resonator in accordance with the present invention provides a frequency selective bandpass response that enables single mode operation of the fiber laser.

Figure 4:
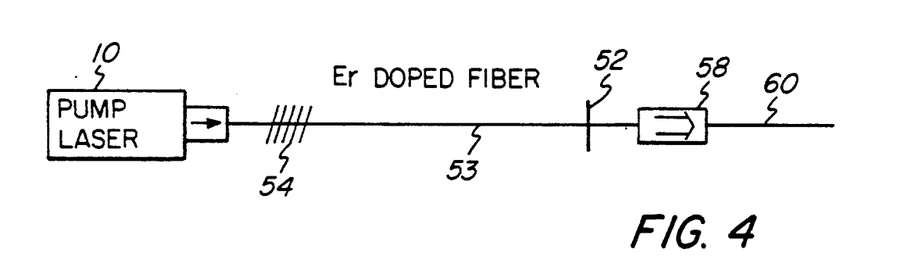
FIG. 4 is a schematic diagram of a linear Erbium fiber laser with a fiber grating for mode selection.

FIG. 4 illustrates a linear structure that also uses a simple reflective grating and mirror which define a Fabry-Perot cavity to provide mode selection. Pump laser 10 provides the optical energy necessary to cause Erbium doped fiber 53 to lase. Grating 54 in combination with mirror 52 defines the length of the laser cavity. Optical isolator 58 restricts perturbing back reflection into the laser cavity. The optical carrier generated by the laser is output on an optical fiber 60. The length of the laser cavity defines the natural resonance(s) of the cavity. The grating is used to select from these natural resonances, thereby providing a single mode within the gain curve of the laser.

The linear cavity of the FIG. 4 embodiment can be constructed from a piece of Erbium doped optical fiber that incorporates a grating within the fiber. Alternatively, the linear cavity can comprise a length of undoped grating fiber coupled to an Erbium doped fiber. Mirror 52 can be constructed, e.g., by evaporating silver, gold, or aluminum on the fiber end, and then splicing the fiber. Alternatively, a dielectric mirror could be formed as well known in the art.

The configuration shown in FIG. 4 is one method for making the laser run at a single frequency. The length of the laser cavity as determined by the reflectors 54 and 52 is short enough so that only one Fabry-Perot mode exists within the cavity. This forces the laser to run single frequency. A specific example of the design of such a laser follows.

The laser can only lase within the width of the reflector. A typical reflector bandwidth is one angstrom. The mode spacing FSR (free spectral range) of a Fabry-Perot cavity is given by the formula:
$FSR = \lambda^2/(2nL)$
where:
 c = speed of light
 n = index of refraction of fiber; 1.46
 L = laser cavity length
 $\lambda$ = laser wavelength in air; 1.55 microns Thus, for a mode spacing (FSR) of one angstrom, the laser cavity length (L) works out to 8.2 millimeters. Clearly, this length is too short to be practical for a doped fiber. Planar silica waveguide heavily doped with Erbium and Germanium could be used to produce a micro laser.

If a grating bandwidth of one picnometer were achieved, then the laser cavity length would work out to L = 82 centimeters. In this case, a highly doped Erbium fiber utilized in a laser cavity of 80 centimeters would yield a single frequency laser.

One method of achieving such a narrow grating is demonstrated in the Ragdale et al article referenced above. An alternative method is illustrated in the compound cavity laser embodiment of FIG. 7. In this design, gratings 100 and 102 each have a reflectivity bandwidth of one angstrom and reflect at the same wavelength. Since the free spectral range of the Fabry-Perot formed by the gratings is less than the reflection bandwidth of the gratings, only one Fabry-Perot mode exists within the reflection bandwidth of the gratings. The cavity formed by grating 100 and mirror 104 is eighty centimeters in length. This yields an FSR of 128 MHz. The FSR for the eight millimeter cavity formed by gratings 100, 102 is 12.8 GHz.

Figure 7:
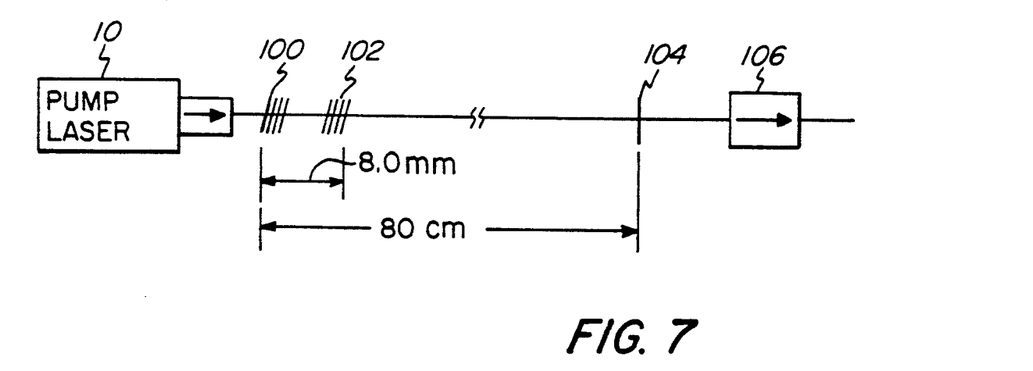
FIG. 7 is a schematic diagram of a linear compound cavity Erbium fiber laser with a pair of fiber gratings.

The short cavity in FIG. 7 produces fringes analogous to peaks 32 and 34 illustrated in FIG. 2. The more closely spaced fringes in FIG. 2 are analogous to the fringes produced by the eighty millimeter cavity. A finesse on the order of one hundred may be required in the Fabry-Perot formed by gratings 100, 102 to ensure proper mode selection. Clearly, as gratings 100, 102 are made narrower in bandwidth, it becomes easier to realize a laser which will select only one mode.

The simple configuration shown in FIG. 4 may be operated at a single frequency even when the optical bandwidth of grating 54 supports more than one Fabry-Perot mode of the cavity formed by reflectors 54 and 52. This is because the Erbium laser is mostly homogeneously broadened so it attempts to self select for single frequency oscillation. The compound cavity design described above applies to other laser systems as well. Neodymium for operation at 1.3 microns is a good example.

Pump lasers for use in practicing the present invention are commercially available from various sources. Gratings are also commercially available, for example, from United Technologies Corporation, which places gratings in fibers that have Germanium dopants. They do this by creating an interference pattern with a high power laser, e.g. at 248 nanometers. This interference pattern is used to expose the fiber, thereby locally modifying the refractive index of the fiber. A similar technique is described in the Belsley et al article cited above.

Reflectors, such as reflector 52 of FIG. 4, can comprise partially reflecting mirrors obtained, for example, by cleaving the fiber, placing a dielectric coating thereon, and then splicing the fiber back together. Other types of suitable reflectors are commercially available. Nearly lossless mirrors can be obtained for mirrors with reflectivities ranging from 5% to 95%. Optical isolators and couplers for use in connection with the present invention are also readily available.

Figure 5:
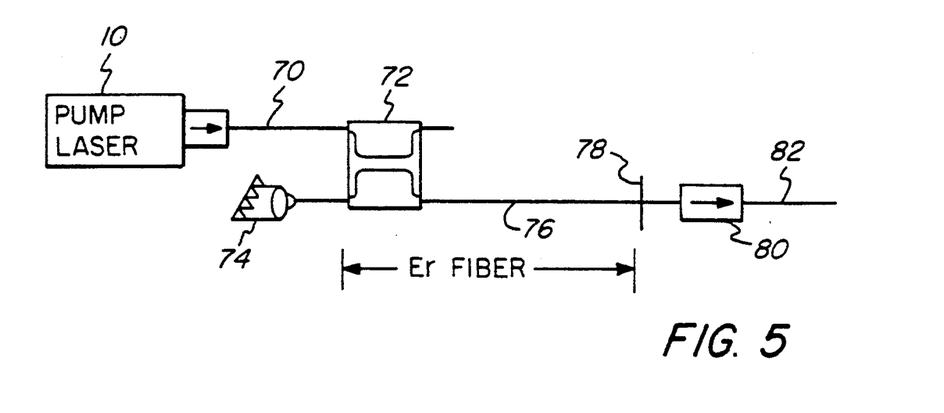
FIG. 5 is a schematic diagram of a linear Erbium fiber laser having an external grating for mode selection.

The bulk optics embodiment illustrated in FIG. 5 can be used to practice the present invention, but has more applicability in the development of the embodiments illustrated in the other figures. Pump laser 10 outputs energy on an optical fiber 70 to a coupler 72. A grating lens 74 is coupled to an Erbium doped fi'er 76 that receives the pump laser energy via coupler 72. This coupler should be a wavelength selective coupler for efficient coupling of pump light into the laser cavity and to prevent light at the lasing frequency from coupling back into the pump laser. Mirror 78 defines the length of the Erbium fiber laser cavity. An optical isolator 80 limits back reflection into the fiber laser. Different grating lenses 74 can be coupled to the Erbium fiber to empirically establish the dimensions required for a desired application.

Figure 6:
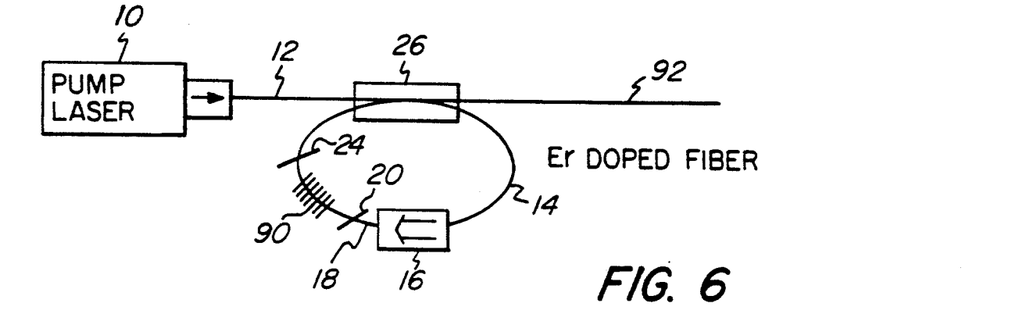
FIG. 6 is a schematic diagram of an Erbium fiber ring laser having series Fabry-Perot cavities and a fiber grating for mode selection.

FIG. 6 illustrates another ring laser embodiment that combines the Fabry-Perot interferometers of FIG. 1 with a simple reflective grating. The dimensions of grating 90 are selected in combination with the cavity lengths to obtain operation with a few longitudinal modes or even a single longitudinal mode if desired. The carrier produced by the laser is output via coupler 26 to an optical fiber 92. As with the other embodiments, the location of mirrors 20, 24 define a cavity length with desired natural resonances. It should be appreciated that grating 90 can be located anywhere within the ring, and does not have to be in the short section between mirrors 20, 24 as illustrated in the figure. In addition, a grating resonator as described in connection with FIG. 3 can be used instead of a simple reflective grating to improve mode selectivity.

It is noted that with ring laser configurations such as illustrated in FIGS. 1, 3 and 6, the polarization sensitivity of the standard couplers, grating(s) and optical isolator(s) may make it necessary to place a polarization controller in the ring cavity to increase finesse. Since a manual polarization controller is not practical for most applications, the solution to the problems of low finesse and polarization sensitivity (bifringence) is to construct the fiber laser with polarization maintaining fiber and to only excite one of the polarization modes. High finesse couplers useful in such embodiments are available from various vendors.

Figure 8:
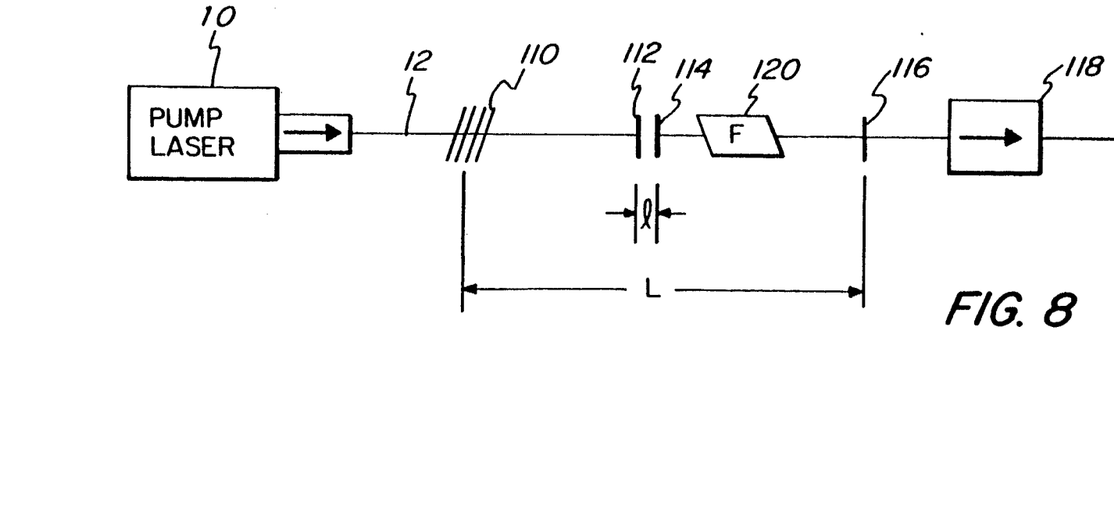
FIG. 8 is a schematic diagram of a linear compound cavity fiber laser having a first Fabry-Perot cavity with a second Fabry-Perot cavity at the center thereof.
Figure 9:
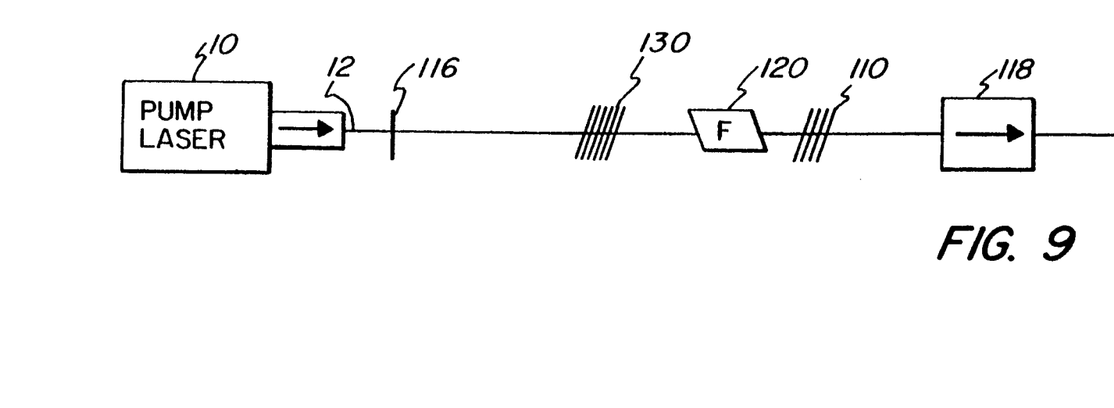
FIG. 9 is a schematic diagram of a linear compound cavity fiber laser having a Fabry-Perot cavity with a Moire grating at the center thereof.

FIG. 8 illustrates a preferred embodiment of a laser using a pair of series coupled Fabry-Perot cavities. A first Fabry-Perot cavity, which is the same as the laser cavity, extends over a length L from a grating 110 to a reflector 116. A second Fabry-Perot cavity is placed at or near the center of the first Fabry-Perot cavity. The second Fabry-Perot cavity has a length 1 and is formed by a first reflector 112 and a second reflector 114. Reflectors 112, 114 can be formed within the waveguide using any combination of metallic, dielectric or grating structures as well known in the art. As an alternative, the second Fabry-Perot cavity can be replaced with a Moire type grating having a transmission peak at the lasing wavelength, which gratings are discussed in the article to Ragdale, et al. cited above. This embodiment is illustrated in FIG. 9, which is similar to the structure shown in FIG. 8 except that the locations of grating 110 and mirror 116 have been arbitrarily reversed and reflectors 112, 114 have been replaced with Moire grating 130.

In the configuration illustrated in FIG. 8, grating 110 can have, for example, a reflectivity of about 95% at the operating wavelength (e.g., 1.5 $\mu$m) of the laser. At this wavelength, reflector 116 will have a reflectivity of about 4-15%. Those skilled in the art will appreciate that the positions of grating 110 and reflector 116 defining the first Fabry-Perot cavity can be interchanged. In such an embodiment, the reflectivity of the reflector 116 adjacent pump laser 10 would be about 100% at the operating wavelength of the laser, and its transmissivity would be about 100% at the pump wavelength. The grating 110, when positioned next to optical isolator 118, would have a reflectivity of about 4-15% at the operating wavelength of the laser.

In both configurations, the length of the first Fabry-Perot cavity L can be on the order of one meter, with the length 1 of the second Fabry-Perot cavity on the order of one millimeter. The free spectral range of the second Fabry-Perot cavity is slightly less than the reflection bandwidth of the grating. The grating restricts the laser to the bandwidth of the grating. The second Fabry-Perot cavity further restricts the bandwidth to the free spectral range (FSR). The cavity length L is chosen to be short enough so that only one Fabry-Perot mode is supported. The second Fabry-Perot cavity is placed near the center of the first Fabry-Perot cavity to minimize gain except at the desired lasing wavelength. This structure should suppress lasing in the potential undesired laser cavities that could otherwise exist between grating 110 and reflector 112 and between reflector 114 and mirror 116. The optimal location of the second Fabry-Perot cavity is determined by the relative lasing thresholds of the competing laser cavities between grating 110 and reflector 112 and between reflector 114 and mirror 116. If the reflectivities of grating 110 and mirror 116 are equal, then the optical placement of the second Fabry-Perot will be centered in the first Fabry-Perot cavity. If grating 110 has a higher reflectivity than mirror 116, then the second Fabry-Perot should be moved closer to grating 110 to minimize the gain of the cavity between grating 110 and reflector 112. Conversely, if mirror 116 has the higher reflectivity, the second Fabry-Perot would be placed closer to it.

In order to suppress lasing in two polarization modes, lasing in one of the two linear polarizations can be suppressed by introducing a polarization filter 120 near the center of the optical cavity. The structure of FIG. 8 can be implemented in a doped optical fiber or a silica waveguide.

Figure 10:
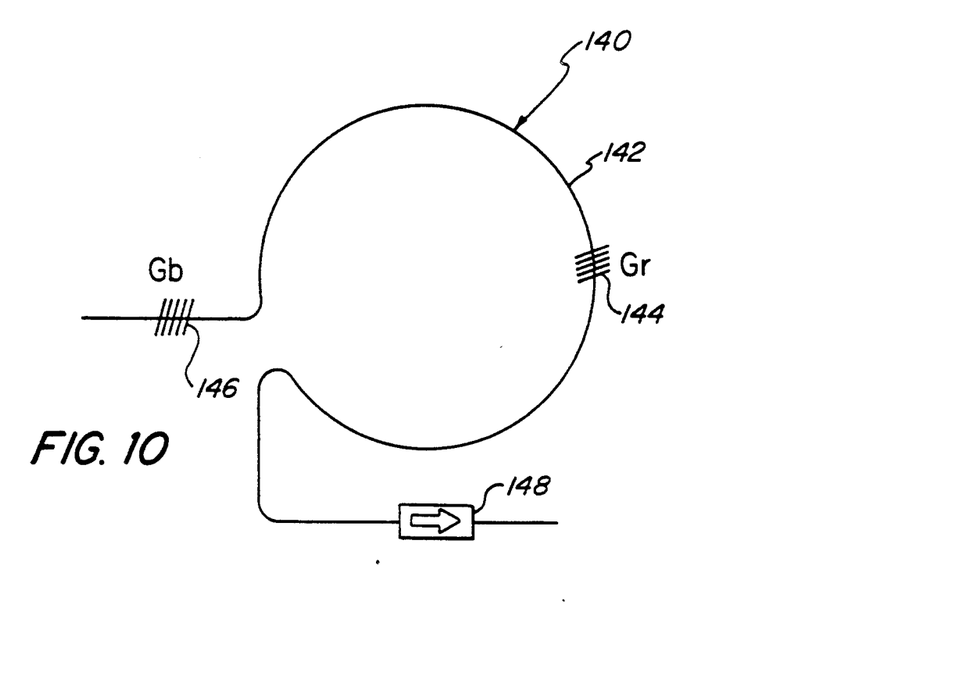
FIG. 10 is a schematic diagram of a Sagnac cavity fiber laser with a grating resonator for mode selection.

FIG. 10 illustrates an embodiment of the present invention which utilizes a Sagnac cavity 140. A conventional Bragg reflector grating 146 is provided at the input to the cavity 140. Grating 146 limits lasing to an intermediate bandwidth that is narrower than that of the Sagnac cavity alone, but not narrow enough to provide single mode operation. To achieve single mode operation, a grating resonator 144 is placed in the cavity 140 in accordance with the present invention. More specifically, the cavity is a guided wave cavity formed from an optical fiber 142, and grating 144 is an in-fiber grating. An optical isolator 148 is provided in a conventional manner. The concatenated structure of reflector 146 and resonator 144 as disclosed herein has been shown experimentally to provide a bandpass of less than 4 GHz, thereby enabling the desired single mode operation.

It should now be appreciated that the present invention provides a rare earth doped laser for providing an optical carrier having at least one suppressed mode. By providing a narrowband grating resonator within a guided wave laser cavity, a single mode laser can be obtained, thereby overcoming the extremely broad lasing bandwidth inherent in rare earth fiber lasers. The laser can be constructed with a doped optical fiber, or in any other optical transmission medium such as a silica glass substrate directly doped with the rare earth element. Such a structure is advantageous in that high levels of integration are obtainable.

Although the invention has been disclosed in connection with various illustrated embodiments, those skilled in the art will realize that various adaptations and modifications may be made thereto without departing from the spirit and scope thereof as set forth in the following claims.

What is claimed is:

1. A laser for providing an optical carrier comprising:
   a laser cavity including an active medium;
   means for pumping said active medium to generate a light beam for output from said laser cavity; and
   a grating resonator with a narrow bandpass characteristic in a guided wave portion of said laser cavity;
   wherein said grating resonator selects a desired mode of laser operation.

2. A laser in accordance with claim 1 wherein said cavity comprises a reflector at one end thereof and a grating at the other end thereof.

3. A laser in accordance with claim 1 wherein said laser cavity is formed in an optical fiber at least partially doped with a rare earth element.

4. A laser in accordance with claim 1 wherein said laser cavity is a ring cavity.

5. A laser in accordance with claim 4 further comprising a Fabry-Perot cavity within said ring cavity.

6. A laser in accordance with claim 1 wherein said laser cavity is a Sagnac cavity.

7. A laser in accordance with claim 6 wherein said cavity comprises a reflector at one end thereof and a grating at the other end thereof.

8. A laser in accordance with claim 1 wherein said laser cavity comprises a Fox-Smith cavity.

9. A laser in accordance with claim 1 wherein said grating resonator comprises a moire grating.

10. A laser in accordance with claim 9 wherein said laser cavity is formed in an optical fiber at least partially doped with a rare earth element.

11. A laser in accordance with claim 10 wherein said laser cavity is a ring cavity.

12. A laser in accordance with claim 11 further comprising a Fabry-Perot cavity within said ring cavity.

13. A laser in accordance with claim 10 wherein said laser cavity comprises a Sagnac cavity.

14. A laser in accordance with claim 13 wherein said cavity comprises a reflector at one end thereof and a grating at the other end thereof.

15. A laser in accordance with claim 10 wherein said laser cavity comprises a Fox-Smith cavity.

* * * * *